UNITED STATES PATENT OFFICE.

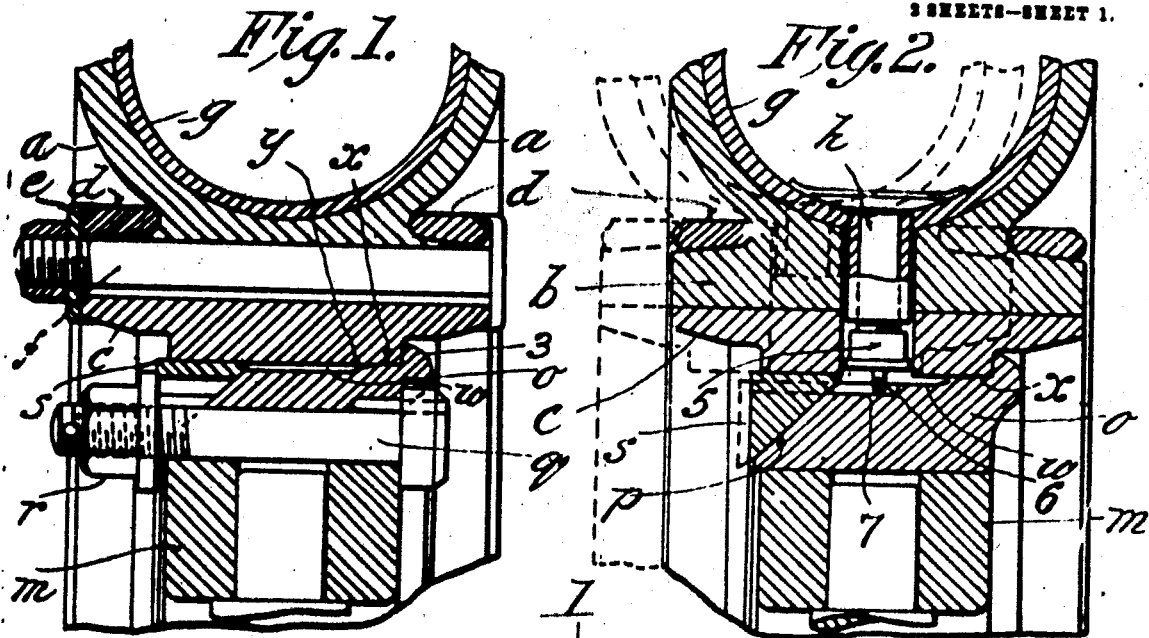
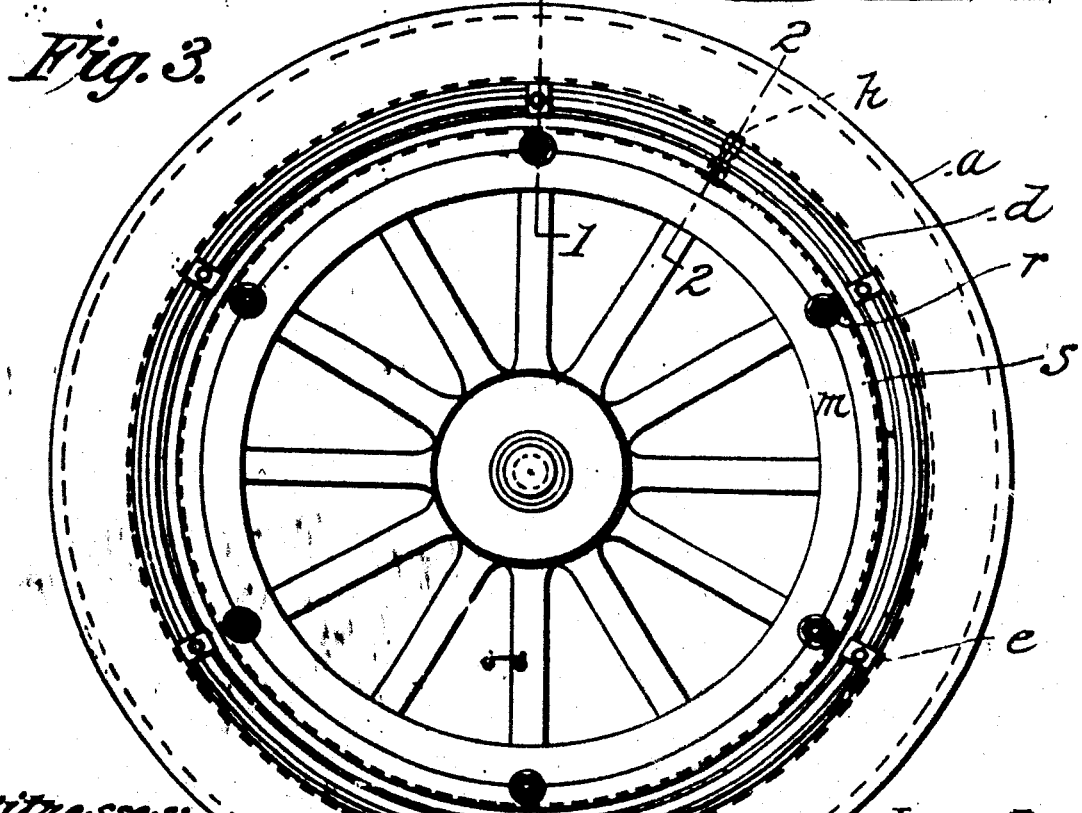

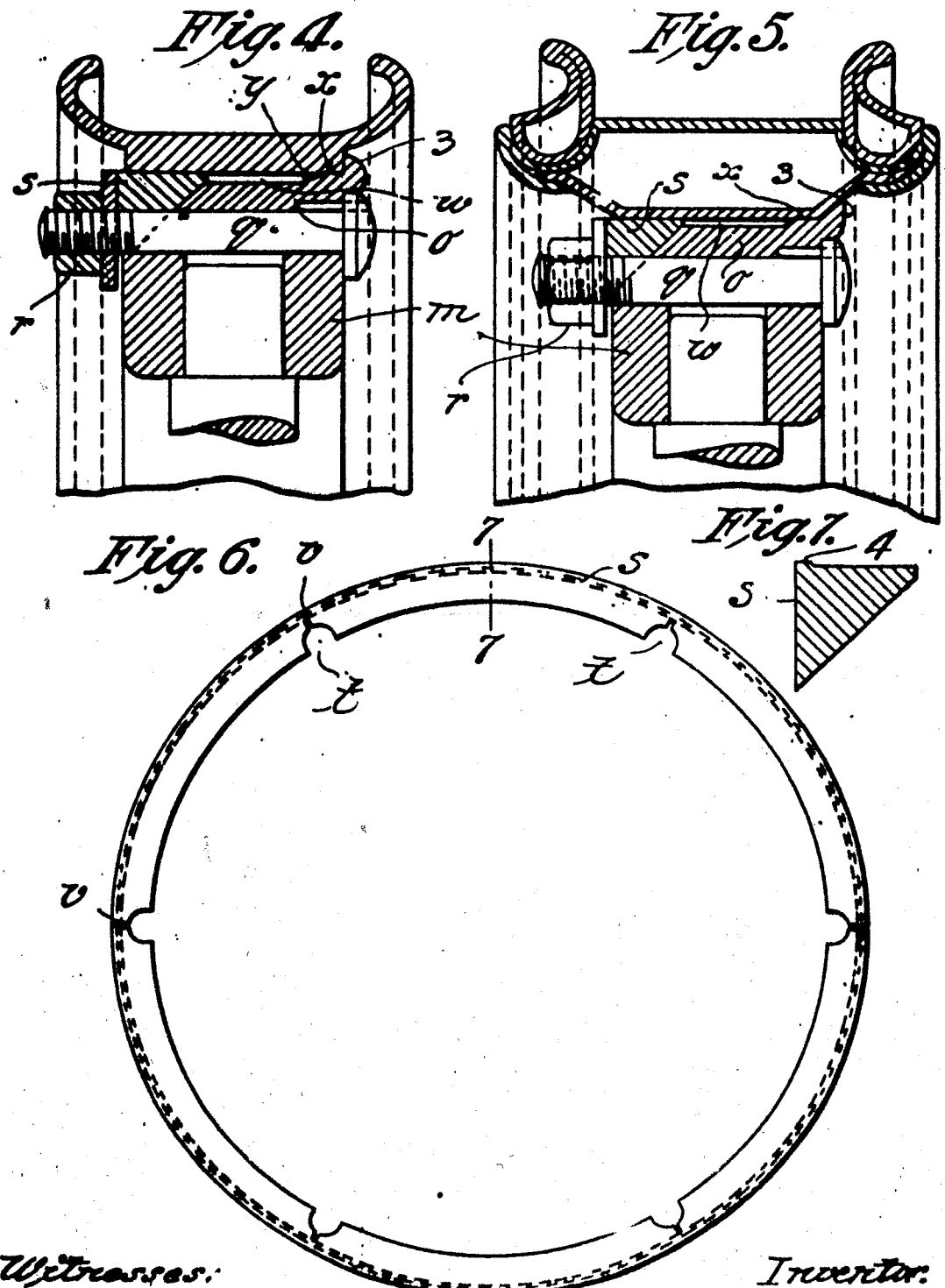

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION.

REMOVABLE WHEEL-RIM.

948,813.  Specification of Letters Patent.  Patented Feb. 8, 1910.

Application filed March 1, 1907. Serial No. 359,967.

*To all whom it may concern:*

Be it known that I, JOHN CLARENCE COLE, a citizen of the United States of America, residing at Chicopee Falls, in the county of Hampden and State of Massachusetts, have invented new and useful Improvements in Removable Wheel-Rims, of which the following is a specification.

This invention relates to vehicle tires and specifically to means to removably attach a metal rim to a wheel, the word "rim" being used to designate the member to which a resilient tire is attached, the rim being fitted over and removably attached to the felly of the wheel with the inflated tire secured to the rim.

The invention is adaptable more particularly to the wheels of self-propelled road-vehicles, and the general practice has heretofore been to have the rim permanently secured on the felly and to attach and detach the tire therefrom, as occasion requires. In practice, however, this has necessitated the deflation of pneumatic tires to remove the same and the replacement and attachment thereof again to the rim in a deflated condition, and the subsequent re-inflation of the tire. These conditions have rendered the removal and replacement of tires a tedious process, to overcome which various means have been devised, the more successful of which embody broadly a tire in an inflated condition attached to a rim which may be quickly fitted to, or removed from, the felly of a wheel, and broadly such a construction is not claimed in this application, the object of this invention being to provide an improved construction of this character which may be quickly attached to and removed from the felly of a wheel, the rim fastening devices being equally well adapted to any one of several types of rims, as hereinafter described, and in this respect, as well as in the specific construction of the rim fastening devices, the invention clearly marks a distinct advance in this art.

The invention is clearly illustrated in the accompanying drawings, in which,—

Figure 1 is a cross sectional elevation of a wheel felly showing a rim and portion of a tire thereon with the rim fastening devices applied to the felly, the plane of the section being on the line 1—1, Fig. 3. Fig. 2 is a view similar to Fig. 1, the plane of the section being however on line 2—2, this view showing in dotted lines the position of the rim and its attached tire partly removed from the felly. This view also shows the general arrangement of the air-valve, as adapted to the construction forming the subject of this application. These Figs. 1 and 2 show the use of the improved tire fastening devices in connection with one type of tire well known commercially. Fig. 3 is a side elevation of a complete wheel on a reduced scale, the construction being the same as that shown in Figs. 1 and 2. Fig. 4 is a cross sectional elevation showing the improved rim fastening devices as applied to another form of rim adapted to receive another commercially well known tire, the latter not being shown, however. Fig. 5 is a cross sectional elevation showing the improved rim-fastening devices as applied to still another type of rim adapted to receive another commercially well known tire,—not shown in the drawing. Fig. 6 is a side elevation of a split ring which constitutes one of the elements of the rim fastening device, and which is shown in cross section on a larger scale in Figs. 1, 2, 4, and 5. Fig. 7 is a cross sectional view of the expansible ring showing the same made with a slightly raised rib, preferably extending around the outer border of the top of the ring.

Inasmuch as the construction of the rim fastening devices is the same whether applied to the form of tire shown in Figs. 1 and 2, or 4 and 5, the description of those devices will be confined to what is shown in said Figs. 1 and 2, as the latter figure is the only one showing the arrangement and construction of the valve, but it is to be understood that a like valve construction is equally well adapted to the form of tire shown in Figs. 4 and 5, if desired; and, furthermore, it is to be understood that the valve construction does not constitute an element of this invention except insofar as it may be embodied in combination with some of the other parts.

Referring now to Figs. 1 and 2, $a$ indicates a tire casing, the flanged base $b$ of which is fitted to a metal rim $c$ and secured thereto by means of rings $d$ fitting over the flanged base on either side of the casing and secured thereto by means of the clip $e$ which engages one of the rings, and the flanged head of a bolt $f$ engaging the other, the bolt being provided with a suitable nut. This construction is substantially that shown in my prior Letters Patent of the United States dated July 17, 1906 and numbered 826,143. Within the casing is the usual inner tube $g$ provided with a valve $h$, as shown in Fig. 2, whereby the inflation of said inner tube may be effected. As heretofore constructed, tires of this type have been provided with valves which extend through the rim and felly of the wheel, but in a construction of the type shown in the present application it is obviously necessary that the valve-tube should be short enough to be removed bodily with the rim $c$, as provided herein, which construction will be more fully described later on. The rim $c$, shown in Figs. 1 and 2, is a solid rim adapted to receive the particular fastening devices for the tire-casing shown in said figures, but any form of rim $c$ may be employed, as for example those shown in Figs. 4 and 5, and whatever may be the particular type of rim (which will be determined by the particular preference of the owner for a certain type of tire) the fastening devices forming the subject matter of this application will be practically the same.

Referring still to Figs. 1 and 2, the wheel felly $m$ is provided with a rim $o$ permanently secured to the periphery thereof, as shown, one edge of said rim being beveled off at an angle of about 45° around the entire circumference thereof. A number of bolts $q$ extend through this rim transversely, the heads of the bolts coming to a bearing against one edge of the rim and the opposite ends of the bolts being provided with nuts $r$ which bear against a split ring $s$ which is triangular in cross section, the beveled edge of the ring fitting the beveled edge of the rim $o$. As this ring is shown in side elevation in Fig. 6, the holes $t$ therein are made to receive the bolts $q$, these holes being preferably somewhat larger than the bolts; and to provide the requisite radial flexibility a saw cut $v$ may be made extending from the bottom of these holes $t$ toward the periphery of the ring whereby when the nuts $r$ are turned up and the ring $s$ forced up the inclined edge $b$ of the rim $o$, the ring may be expanded equally throughout its entire circumference against the under side of the rim $c$. Normally, the ring $s$ is made of somewhat less diameter than the external diameter of the rim $o$ to the end that when the nuts $r$ are loosened, the ring will be self-contracting and thus reduce itself to a diameter less than that of the rim $o$ as the nuts $r$ are turned back on their bolts, and thus leave the rim $c$ free to be removed bodily from its seat on the rim $o$ with the tire casing $a$ attached thereto. In order to facilitate the easy placement and removal of the rim $c$, to and from its seat on the fixed rim $o$, said rim $o$ is provided with a seat on said rim $o$, preferably only at its outer edges, and to that end the rim $o$ is cut away, as at $w$, (Figs. 1 and 2) leaving a narrow seat portion $x$ for the rim $c$ at one edge of the rim $o$, the ring $s$ being expanded as described against the under side of the opposite edge of the rim $c$. By this means, owing to the rigidity of the rim $c$, the latter will be as firmly supported as though it had a bearing for the entire width thereof on the rim $o$, and when the ring $s$ is contracted, the degree of movement necessary to free the rim $c$ from said rim $o$ is represented by the width of the seat $x$. This movement, as seen, would be a very slight one and as soon as the rim $c$ is disengaged from its seat, the reduced diameter of the rim $o$ beyond the seat will leave the rim $c$ so loosely seated that it can be easily taken off. Furthermore, a still further advantage of this narrow seat portion is that it reduces the area of the surfaces which must be nicely fitted to substantially the area of the seat portion $x$, and as this seat portion is approached by an inclined surface $y$, the rim $c$ slides onto it quite easily and naturally; whereas, if a close fit between the two rims were necessary, as would be the case in the absence of an expansible device, special tools would be necessary to fit these parts together, and the slightest injury to either of them would make it practically impossible to fit the rim $c$ to its seat. It is of course necessary that some sort of a stop or abutment for the rim $c$ be provided, and the most obvious mechanical expedient is the provision of a slight flange 3 on that edge of the rim $o$ opposite to that on which the expansible ring $s$ is located; and in carrying out this invention, it is preferred that the flange 3 should be on the inside of the wheel to the end that when the vehicle, on which the wheel is mounted, turns a corner the flange would be in position to receive the lateral thrust to which the outer wheel of a vehicle is subjected. If desired, however, a rib 4 extending slightly above the upper surface of the expansible ring $s$ may be formed on the outer edge of said ring thus providing an abutment similar to the flange 3 on the fixed rim whereby the removable rim will be restrained against lateral movement in either direction, and making it possible to fit the wheel to the axle so that the nuts $r$ of the bolts $q$ may be located either on the outside or the inside of the wheel. This rib 4, however, is not considered an essential feature of the construction because the ring $s$ may be expanded with such force against the under side of the removable rim as to hold the latter immovable on the wheel against any lateral strain to which the wheel might be subjected.

Referring now to Figs. 1 and 2, it will be observed that the stem of the valve $h$ extends only through the removable rim in a hole provided therein for that purpose, and in order to facilitate the removal of the cap 5 from the stem, the centrally located boss 6 thereon is extended somewhat below the inner surface of said rim to the end that a screw-driver or other suitable tool may be applied thereto easily and conveniently for removing the cap. This makes it necessary to mill a groove 7 (shown particularly in Fig. 3) in the upper surface of the permanent rim to receive the boss 6, and extending from near the center of the rim to that border thereof over which the removable rim is drawn in removing the same. This particular construction however, does not constitute any part of this invention and is shown only as illustrating one way in which provision may be made for providing for the application of a short valve-stem to the removable rim and tire which this rim carries.

What I claim, is:—

1. A wheel comprising a metal rim permanently secured to the felly and having one of its edges beveled, a tire rim fitting loosely over the fixed rim and overhanging the beveled portion thereof, an expansible and self-contracting ring whose normal external diameter is less than the internal diameter of said tire rim, interposed between the fixed rim and tire rim, said ring having a beveled under surface parallel with the beveled edge of the fixed rim, and an upper surface parallel with the inner surface of the removable rim, and means to move said ring against the beveled surface on the fixed rim to expand the ring radially to a greater diameter than its normal condition, thereby forcing the same into binding contact with the removable rim to lock the latter to the wheel.

2. A wheel comprising a fixed rim having one of its edges beveled, a removable rim loosely fitted over the fixed rim and overhanging the beveled edge of the latter and adapted to have a tire seated thereon, an expansible and self-contracting ring interposed between the fixed and removable rims, and means to force said ring against the beveled edge of the fixed rim to expand it against and into binding contact with the under surface of the removable rim to lock the latter on the wheel.

3. In a wheel, the combination of a felly having a fixed rim provided at one edge with an outstanding fixed abutment and having its opposite edge beveled, a removable rim loosely fitted over the fixed rim and arranged to engage said abutment and overhang the beveled edge of the fixed rim, an expansible and self-contracting ring interposed between the fixed and removable rims and having a beveled under surface engaging said beveled edge of the fixed rim, and fastening means arranged to move said ring against said beveled surface on the fixed rim to expand the ring radially into binding contact with the removable rim to lock the latter to the wheel.

JOHN CLARENCE COLE.

Witnesses:
K. I. CLEMONS.
H. W. BOWEN.